US006973036B2

(12) United States Patent
Goetzinger et al.

(10) Patent No.: US 6,973,036 B2
(45) Date of Patent: Dec. 6, 2005

(54) QOS SCHEDULER AND METHOD FOR IMPLEMENTING PEAK SERVICE DISTANCE USING NEXT PEAK SERVICE TIME VIOLATED INDICATION

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 10/004,373

(22) Filed: Nov. 1, 2001

(65) Prior Publication Data

US 2003/0081543 A1  May 1, 2003

(51) Int. Cl.[7] .............................................. H04B 17/00
(52) U.S. Cl. .................... 370/235; 370/395.4; 370/462; 709/234
(58) Field of Search ................................ 370/229, 230, 370/232, 235, 252, 253, 412–418, 395.4, 370/395.41, 395.42, 395.43, 395.1, 462, 370/461; 709/223, 225, 232, 234

(56) References Cited

U.S. PATENT DOCUMENTS

| | | | |
|---|---|---|---|
| 5,249,184 A | 9/1993 | Woeste et al. | |
| 5,490,141 A | 2/1996 | Lai et al. | |
| 5,548,590 A | 8/1996 | Grant et al. | |

(Continued)

FOREIGN PATENT DOCUMENTS

EP          0859492 A2      8/1998

(Continued)

OTHER PUBLICATIONS

U.S. Appl. No. 10/002,416, filed Nov. 1, 2001, by William John Goetzinger, Glen Howard Handlogten, James Francis Mikos, and David Alan Norgaard entitled "QoS Scheduler and Method for Implementing Quality of Service With Aging Time Stamps".

(Continued)

Primary Examiner—John Pezzlo
Assistant Examiner—Brian Roberts
(74) Attorney, Agent, or Firm—Joan Pennington

(57) ABSTRACT

A scheduler and scheduling method implement peak service distance using a next peak service time violated (NPTV) indication. A flow scheduled on a best effort or weighted fair queue (WFQ) is identified for servicing and a frame is dispatching from the identified flow. A next PSD time (NPT) being violated is checked for the flow. Responsive to identifying the next PSD time (NPT) being violated for the identified flow, a NPTV indicator is set. Alternatively, responsive to identifying the next PSD time (NPT) not being violated for the identified flow, the NPTV indicator is reset. A next PSD time (NPT) value is calculated for the flow. Checking for more frames to be dispatched from the flow is performed. Responsive to identifying no more frames to be dispatched from the flow, the NPTV indicator is utilized to identify a calendar for attaching the flow upon a new frame arrival for the flow. If the NPTV indicator is not set when the flow goes empty, upon a new frame arrival for the flow, the flow is attached to a weighted fair queue (WFQ) ring using a queue distance calculation. If the NPTV indicator is set when the flow goes empty, upon a new frame arrival for the flow, then it is determined if the next PSD time (NPT) value for the flow has been passed. If the next PSD time (NPT) value has been passed, then the flow is attached to the weighted fair queue (WFQ) ring using the queue distance calculation. If the next PSD time (NPT) value has not been passed, then the flow is attached to a peak bandwidth service (PBS) calendar using the next PSD time (NPT) value.

20 Claims, 7 Drawing Sheets

U.S. PATENT DOCUMENTS

| | | | |
|---|---|---|---|
| 5,629,928 | A | 5/1997 | Calvignac et al. |
| 5,742,772 | A | 4/1998 | Sreenan |
| 5,790,545 | A | 8/1998 | Holt et al. |
| 5,831,971 | A | 11/1998 | Bonomi et al. |
| 5,844,890 | A | 12/1998 | Delp et al. |
| 5,850,399 | A | 12/1998 | Ganmukhi et al. |
| 5,926,459 | A | 7/1999 | Lyles et al. |
| 5,926,481 | A | 7/1999 | Wang et al. |
| 5,946,297 | A | 8/1999 | Calvignac et al. |
| 5,999,963 | A | 12/1999 | Bruno et al. |
| 6,014,367 | A | 1/2000 | Joffe |
| 6,018,527 | A | 1/2000 | Yin et al. |
| 6,028,842 | A | 2/2000 | Chapman et al. |
| 6,028,843 | A | 2/2000 | Delp et al. |
| 6,031,822 | A | 2/2000 | Wallmeier |
| 6,038,217 | A | 3/2000 | Lyles |
| 6,041,059 | A | 3/2000 | Joffe et al. |
| 6,064,650 | A | 5/2000 | Kappler et al. |
| 6,064,677 | A | 5/2000 | Kappler et al. |
| 6,072,772 | A | 6/2000 | Charny et al. |
| 6,072,800 | A | 6/2000 | Lee |
| 6,078,953 | A | 6/2000 | Vaid et al. |
| 6,081,507 | A | 6/2000 | Chao et al. |
| 6,092,115 | A | 7/2000 | Choudhury et al. |
| 6,094,435 | A | 7/2000 | Hoffman et al. |
| 6,101,193 | A | 8/2000 | Ohba |
| 6,104,700 | A | 8/2000 | Haddock et al. |
| 6,108,307 | A | 8/2000 | McConnell et al. |
| 6,122,673 | A | 9/2000 | Basak et al. |
| 6,144,669 | A | 11/2000 | Williams et al. |
| 6,157,614 | A | 12/2000 | Pasternak et al. |
| 6,157,649 | A | 12/2000 | Peirce et al. |
| 6,157,654 | A | 12/2000 | Davis |
| 6,169,740 | B1 | 1/2001 | Morris et al. |
| 6,188,698 | B1 | 2/2001 | Galand et al. |
| 6,226,267 | B1 | 5/2001 | Spinney et al. |
| 6,229,812 | B1 | 5/2001 | Parruck et al. |
| 6,229,813 | B1 | 5/2001 | Buchko et al. |
| 6,236,647 | B1 | 5/2001 | Amalfitano |
| 6,469,982 | B1 | 10/2002 | Henrion et al. |
| 6,646,986 | B1 | 11/2003 | Beshai |
| 6,721,325 | B1 * | 4/2004 | Duckering et al. ...... 370/395.4 |
| 6,804,249 | B1 | 10/2004 | Bass et al. |
| 6,810,012 | B1 * | 10/2004 | Yin et al. ................ 370/230.1 |
| 6,888,830 | B1 | 5/2005 | Snyder II et al. |
| 2002/0023168 | A1 * | 2/2002 | Bass et al. .................. 709/232 |
| 2003/0588798 | | 3/2003 | Rumph |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/004,440, filed Nov. 1, 2001, by William John Goetzinger, Glen Howard Handlogten, James Francis Mikos, and David Alan Norgaard entitled "QoS Scheduler and Method for Implementing Quality of Service With Cached Status Array".

U.S. Appl. No. 10/004,217, filed Nov. 1, 2001, by William John Goetzinger, Glen Howard Handlogten, James Francis Mikos, and David Alan Norgaard entitled "QoS Scheduler and Method for Implementing Quality of Service Anticipating the End of a Chain of Flows".

U.S. Appl. No. 10/016,518, filed Nov. 1, 2001, by William John Goetzinger, Glen Howard Handlogten, James Francis Mikos, and David Alan Norgaard entitled "Weighted Fair Queue Having Extended Effective Range".

U.S. Appl. No. 10/015,994, filed Nov. 1, 2001, by William John Goetzinger, Glen Howard Handlogten, James Francis Mikos, and David Alan Norgaard entitled "Weighted Fair Queue Serving Plural Output Ports".

U.S. Appl. No. 10/015,760, filed Nov. 1, 2001, by William John Goetzinger, Glen Howard Handlogten, James Francis Mikos, and David Alan Norgaard entitled "Weighted Fair Queue Having Adjustable Scaling Factor".

U.S. Appl. No. 10/002,085, filed Nov. 1, 2001, by William John Goetzinger, Glen Howard Handlogten, James Francis Mikos, and David Alan Norgaard entitled "Empty Indicators for Weighted Fair Queues".

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

U.S. Appl. No. 10/102,343, filed Mar. 20, 2002, "Network Processor Having Fast Flow Queue Disable Process".

\* cited by examiner

QOS SCHEDULER AND METHOD FOR IMPLEMENTING PEAK SERVICE DISTANCE USING NEXT PEAK SERVICE TIME VIOLATED INDICATION

FIELD OF THE INVENTION

The present invention relates generally to the storage and data networking fields, and more particularly, relates to a QoS scheduler and method for implementing peak service distance using a next peak service time violated indication.

RELATED APPLICATIONS

Related United States patent applications by William John Goetzinger, Glen Howard Handlogten, James Francis Mikos, and David Alan Norgaard and assigned to the present assignee are being filed on the same day as the present patent application including:

U.S. patent application Ser. No. 10/002,416, entitled "QoS SCHEDULER AND METHOD FOR IMPLEMENTING QUALITY OF SERVICE WITH AGING TIME STAMPS";

U.S. patent application Ser. No. 10/004,440, entitled "QoS SCHEDULER AND METHOD FOR IMPLEMENTING QUALITY OF SERVICE WITH CACHED STATUS ARRAY";

U.S. patent application Ser. No. 10/004,217, entitled "QoS SCHEDULER AND METHOD FOR IMPLEMENTING QUALITY OF SERVICE ANTICIPATING THE END OF A CHAIN OF FLOWS";

U.S. patent application Ser. No. 10/016,518, entitled "WEIGHTED FAIR QUEUE HAVING EXTENDED EFFECTIVE RANGE";

U.S. patent application Ser. No. 10/015,994, entitled "WEIGHTED FAIR QUEUE SERVING PLURAL OUTPUT PORTS";

U.S. patent application Ser. No. 10/015,760, entitled "WEIGHTED FAIR QUEUE HAVING ADJUSTABLE SCALING FACTOR"; and U.S. patent application Ser. No. 10/002,085, entitled "EMPTY INDICATORS FOR WEIGHTED FAIR QUEUES".

DESCRIPTION OF THE RELATED ART

Storage and data networks are designed to support the integration of high quality voice, video, and high speed data traffic. Storage and data networking promises to provide transparent data sharing services at high speeds. It is easy to see that rapid movement and sharing of diagrams, pictures, movies, audio, and the like requires tremendous bandwidth. Network management is concerned with the efficient management of every bit of available bandwidth.

A need exists for a high speed scheduler for networking that ensures the available bandwidth will not be wasted and that the available bandwidth will be efficiently and fairly allocated. The scheduler should permit many network traffic flows to be individually scheduled per their respective negotiated Quality-of-Service (QoS) levels. This would give system administrators the ability to efficiently tailor their gateways, switches, storage area networks (SANs), and the like. Various QoS can be set up using combinations of precise guaranteed bandwidth, required by video for example, and limited or unlimited best effort bandwidth for still pictures, diagrams, and the like. Selecting a small amount of guaranteed bandwidth with the addition of some bandwidth from the pool of best effort bandwidth should guarantee that even during the highest peak periods, critical data will be delivered to its application at that guaranteed rate.

A scheduler advantageously may be added to a network processor to enhance the quality of service (QoS) provided by the network processor subsystem.

One of the functions of a QoS scheduler is to limit the best effort bandwidth allocated to a flow based on a peak service distance (PSD) specification. The peak service distance (PSD) specification is a negotiated Quality-of-Service (QoS) level for an individual traffic flow. The QoS scheduler should individually schedule each of multiple flows per their respective assigned PSD specification, even when additional bandwidth is available.

A problem of conventional arrangements results where a flow violates its peak service distance (PSD) specification at the same time that the flow goes empty. Then in conventional arrangements, when another frame for this flow arrives, the flow is scheduled such that the flow may immediately be selected as a winner, that is the flow may immediately identified for servicing. In that case the new frame would be dispatched and the flow would again be empty. This cycle could repeat indefinitely, and the timing could be such that the flow would receive much more bandwidth than specified by its PSD specification.

A need exists for a scheduler and scheduling method for implementing scheduling so that an individual flow does not receive more service than deserved.

SUMMARY OF THE INVENTION

A principal object of the present invention is to provide a scheduler and method for implementing peak service distance using a next peak service time violated indication. Other important objects of the present invention are to provide such scheduler and method for implementing peak service distance using next peak service time violated indication substantially without negative effect and that overcome many of the disadvantages of prior art arrangements.

In brief, a scheduler and method are provided for implementing peak service distance using a next peak service time violated (NPTV) indication. A flow scheduled on a best effort or weighted fair queue (WFQ) is identified for servicing and a frame is dispatching from the identified flow. A next PSD time (NPT) for the flow is checked to see if it has been violated. Responsive to identifying the next PSD time (NPT) being violated for the identified flow, a NPTV indicator is set. Alternatively, responsive to identifying the next PSD time (NPT) not being violated for the identified flow, the NPTV indicator is reset. A next PSD time (NPT) value is calculated for the flow. Checking for more frames to be dispatched from the flow is performed. Responsive to identifying no more frames to be dispatched from the flow, the NPTV indicator is utilized to identify a calendar or ring for attaching the flow upon a new frame arrival for the flow.

In accordance with features of the invention, if the NPTV indicator is not set when the flow goes empty, upon a new frame arrival for the flow, the flow is attached to a weighted fair queue (WFQ) ring using a queue distance calculation. If the NPTV indicator is set when the flow goes empty, upon a new frame arrival for the flow, then it is determined if the next PSD time (NPT) value has been passed. If the next PSD time (NPT) value has been passed, then the flow is attached to the weighted fair queue (WFQ) ring using the queue distance calculation. If the next PSD time (NPT) value has not been passed, then the flow is attached to a peak bandwidth service (PBS) calendar using the next PSD time (NPT) value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
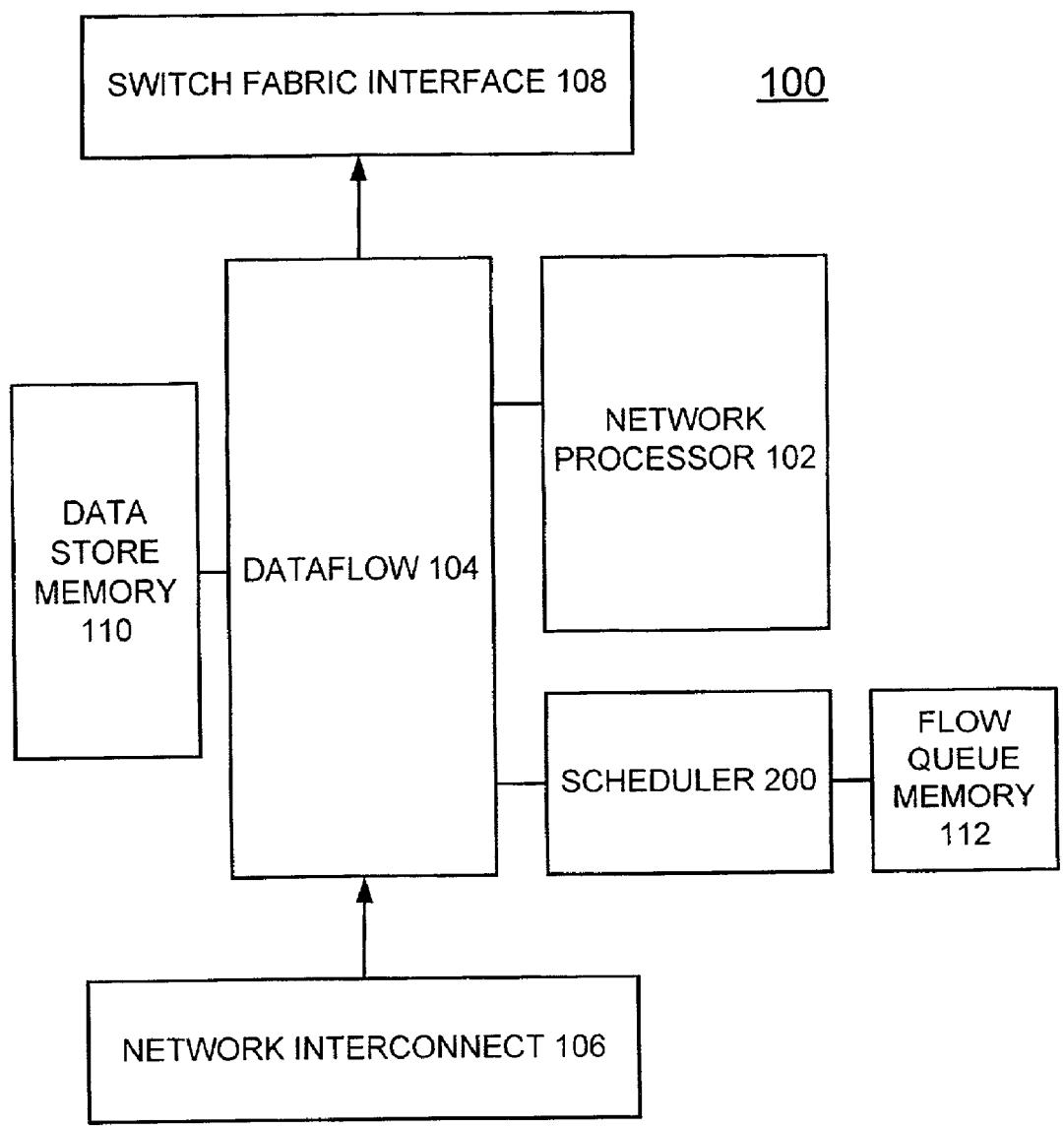
FIG. 1A is a block diagram illustrating a network processor system including a scheduler for carrying out scheduling methods for implementing peak service distance using next peak service time violated indication of the preferred embodiment.

Having reference now to the drawings, in FIG. 1A, there is shown a network processor system generally designated by the reference character 100 including a scheduler 200 for carrying out scheduling methods for implementing peak service distance (consumption of excess bandwidth up to a specified limit) using a next peak service time violated indication of the preferred embodiment. As shown in FIG. 1A, network processor system 100 includes a network processor 102 that executes software responsible for forwarding network traffic. Network processor 102 includes hardware assist functions for performing operations, such as table searches, policing, and statistics tracking. A dataflow 104 serves as the primary data path for transmitting and receiving data flow traffic, for example, via a network interconnect 106 and/or a switch fabric interface 108. Dataflow 104 provides an interface to a large data store memory 110 for buffering of traffic bursts when an incoming frame rate exceeds an outgoing frame rate. An external flow queue memory 112 is coupled to scheduler 200. As network processor performance continues to increase, unique techniques and design solutions enable the QoS scheduler 200 of the preferred embodiment to perform reliably at these high data rates.

Scheduler 200 of the preferred embodiment permits many network traffic flows, for example, 64 thousand (64K) network traffic flows to be individually scheduled per their respective assigned Quality-of-Service (QoS) level. Each flow is basically a one-way connection between two different points. QoS parameters are held in a flow queue control block (FQCB), such as in the external flow queue memory 112. QoS parameters include sustained service distance (SSD), peak service distance (PSD), queue distance (QD), port identification (ID), and the like. There can be, for example, 64 thousand flows and a FQCB for each flow.

Figure 1B:
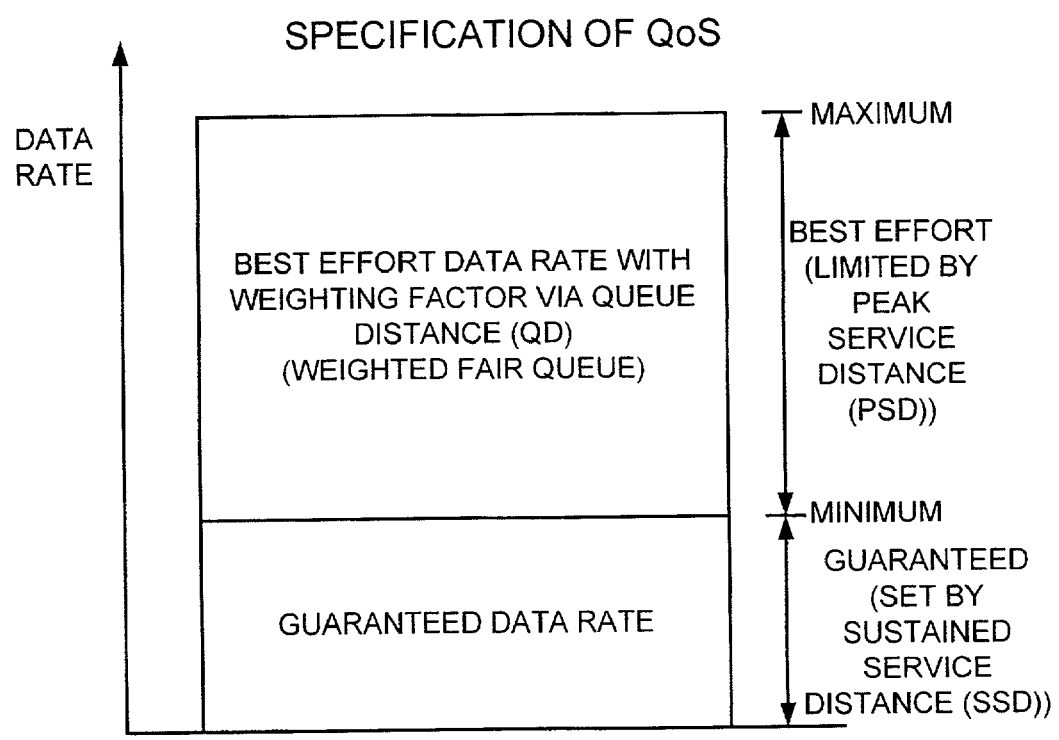
FIG. 1B is diagram providing a graphical illustration of various types of QoS algorithms in accordance with the preferred embodiment.

FIG. 1B provides a graphical illustration of various types of QoS algorithms. The scheduler 200 provides for quality of service by maintaining flow queues that may be scheduled using various algorithms, such as a set guaranteed bandwidth, or best effort or weighted fair queue (WFQ) with or without a peak bandwidth service (PBS) limit. The best effort or weighted fair queue is limited via the peak service distance (PSD) QoS parameter. The guaranteed bandwidth is set via the sustained service distance (SSD) QoS parameter. A combination of these algorithms provide efficient utilization of available bandwidth. The scheduler 200 supplements the congestion control algorithms of dataflow 104 by permitting frames to be discarded based on per flow queue thresholds.

Figure 2:
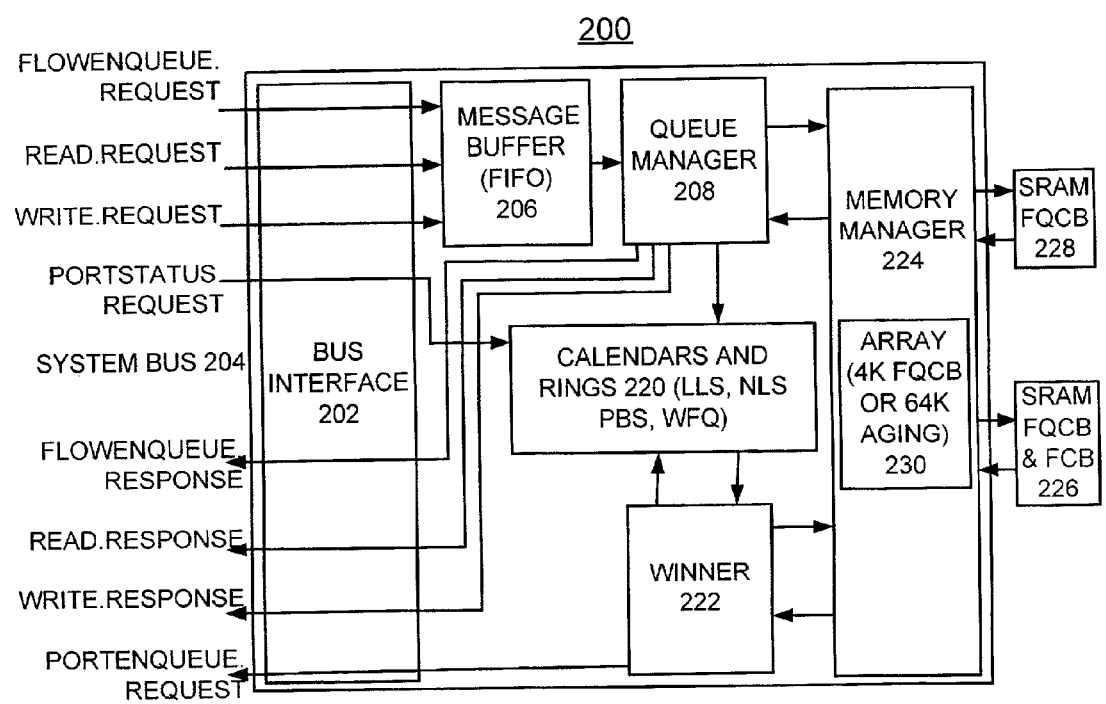
FIG. 2 is a high-level system diagram illustrating the QoS scheduler for carrying out scheduling methods for implementing peak service distance using next peak service time violated indication of the preferred embodiment.

Referring now to FIG. 2, there is shown a high-level system diagram illustrating the scheduler 200 for carrying out scheduling methods of the preferred embodiment. Scheduler 200 includes a bus interface 202 coupled to a system bus 204 interconnecting modules in the system 100. Chipset messages are exchanged between modules using system bus 204. Messages include flow enqueue requests which add frames to a given flow and read and write requests. Scheduler 200 includes a message buffer 206, such as a first-in first-out (FIFO) message buffer, that stores messages until they are ready to be executed. Scheduler 200 includes a queue manager 208 coupled to the message buffer 206. Queue manager 208 processes the incoming messages to determine what action is required. Queue manager 208 is coupled to calendars and rings block 220 and a memory manager 224. A winner partition 222 arbitrates between the calendars and rings 220 to choose which flow will be serviced next. The memory manager 224 coordinates data reads from and writes to a first and second external static random access memory (SRAM) 226 and 228 and an internal memory array 230.

For a flow enqueue request received by queue manager 208, the flow's FQCB information is retrieved from one of the external SRAM 226 or 228 or internal array 230 and examined to determine if the new frame should be added to an existing frame string for a given flow, start a new frame string, or be discarded. In addition, the flow queue may be attached to a calendar or ring for servicing in the future. Read and write request messages received by queue manager 208 are used to initialize flows.

Port back-pressure from the dataflow 104 to the scheduler 200 occurs via the port status request message originated from the dataflow and applied to the calendar and rings block 220. When a port threshold is exceeded, all WFQ and PBS traffic associated with that port is held in the scheduler 200 and the selection logic of winner partition 222 does not consider those flows as potential winners. When port back-pressure is removed, the flows associated with that port are again eligible to be winners.

Calendars and rings block 220 includes, for example, three calendars (low latency service (LLS), normal latency service (NLS), peak bandwidth service (PBS)) and weighted fair queues (WFQs). The calendars are time based. The weighted fair queues (WFQs) are weight based. The WFQs are also referred to as best effort queues because WFQs can only schedule excess bandwidth and therefore can have no bandwidth guarantee associated with them.

Flows are attached to one or more of three calendars/rings (LLS, NLS, PBS) and one WFQ ring 220 in a manner consistent with its QoS parameters. For example, if a flow has a guaranteed bandwidth component, it is attached to a time based calendar. If a flow has a WFQ component, it is attached to a WFQ ring. A flow may have both a guaranteed component and best effort or WFQ component. The calendars 220 are used to provide guaranteed bandwidth with both a low latency service (LLS) and a normal latency service (NLS) packet rate. Flows are scheduled for service at a certain time in the future. The WFQ rings are used by the weighted fair queuing algorithm. Entries are chosen based upon position in the WFQ rings without regard to time. The WFQ rings are work conserving or idle only when there are no flows to be serviced. A flow set up using a WFQ ring can optionally have a peak bandwidth limit associated with it.

Scheduler 200 performs high speed scheduling, for example, processing 27 Million frames per second (Mframes/second). Scheduling rates per flow for the LLS, NLS and PBS calendars 220 range, for example, from 10 Giga bits per second (Gbps) to 3.397 Thousand bits per second (Kbps). Rates do not apply to the WFQ ring.

SRAM 226 is an external high speed, for example, quad data rate (QDR) SRAM containing flow queue information or flow queue control block (FQCB) information and frame information or frame control block (FCB) information. SRAM 228 is, for example, an optional external QDR SRAM containing flow queue information or flow queue control block (FQCB) depending on the number of flows. Internal array 230 contains for example, 4 k FQCB or 64K aging information. Internal array 230 may be used in place of the external SRAM 228 if less than for example four thousand (4K) flows are required and is also used to hold time stamp aging information. Internal array 230 containing FQCB aging information is used with logic that searches through the flows and invalidates expired time stamps.

Queue manager 208 performs the queuing operation of scheduler 200 generally as follows: A linked list or string of frames is associated with each flow. Frames are always enqueued to the tail of the linked list. Frames are always dequeued from the head of the linked list. Flows are attached to one or more of four calendars/rings (LLS, NLS, PBS, WFQ) 220 using the QoS parameters. Selection of which flow to service is done by examining the calendars/rings 220 in the order of LLS, NLS, PBS, WFQ. Then the frame at the head of the selected flow is selected for service. The flow queues are not grouped in any predetermined way to target port. The port number for each flow is user programmable. All WFQ flows with the same port ID are attached to the same WFQ ring. The QoS parameters also apply to the discard flow. The discard flow address is user selectable and is set up at configuration time.

When a flow enqueue request is sent to the scheduler 200, its frame is tested for possible discard using information from the flow enqueue request message and information stored in the FQCB. If the frame is to be discarded then the FQCB pointer is changed from the FQCB in flow enqueue request message to the discard FQCB. Alternatively, the frame is added to the tail end of the FCB chain associated with the FQCB. In addition, the flow is attached if it is not already attached to the appropriate calendar (LSS, NLS, PBS), or ring (WFQ). As time passes, selection logic of winner partition 222 determines which flow is to be serviced (first LLS, then NLS, then PBS, then WFQ). If a port bandwidth threshold has been exceeded, the WFQ and PBS component associated with that port are not eligible to be selected. When a flow is selected as the winner, the frame at the head of the FCB chain for the flow is dequeued and a port enqueue response message is issued to the dataflow 104. If the flow is eligible for a calendar reattach, the flow is reattached to the appropriate calendar (LLS, NLS, PBS) or ring (WFQ) in a manner consistent with the QoS parameters.

In accordance with features of the preferred embodiment, a scheduling method of monitoring flow service is provided so that a flow does not receive more service than deserved. An indicator is used to determine how a new attach should be performed after a flow has gone empty and a new frame for the flow arrives. This indicator is a next PSD time violated (NPTV). If a flow violates its PSD specification at the time the flow goes empty, its NPTV indicator is set to signal the violation. In addition to the indicator being set, if when the new frame arrives not enough time has passed to put the bandwidth for the flow at or below its peak bandwidth specification, then the flow is scheduled directly on the PSD calendar to ensure it does not receive more service than is deserved.

Figure 3:
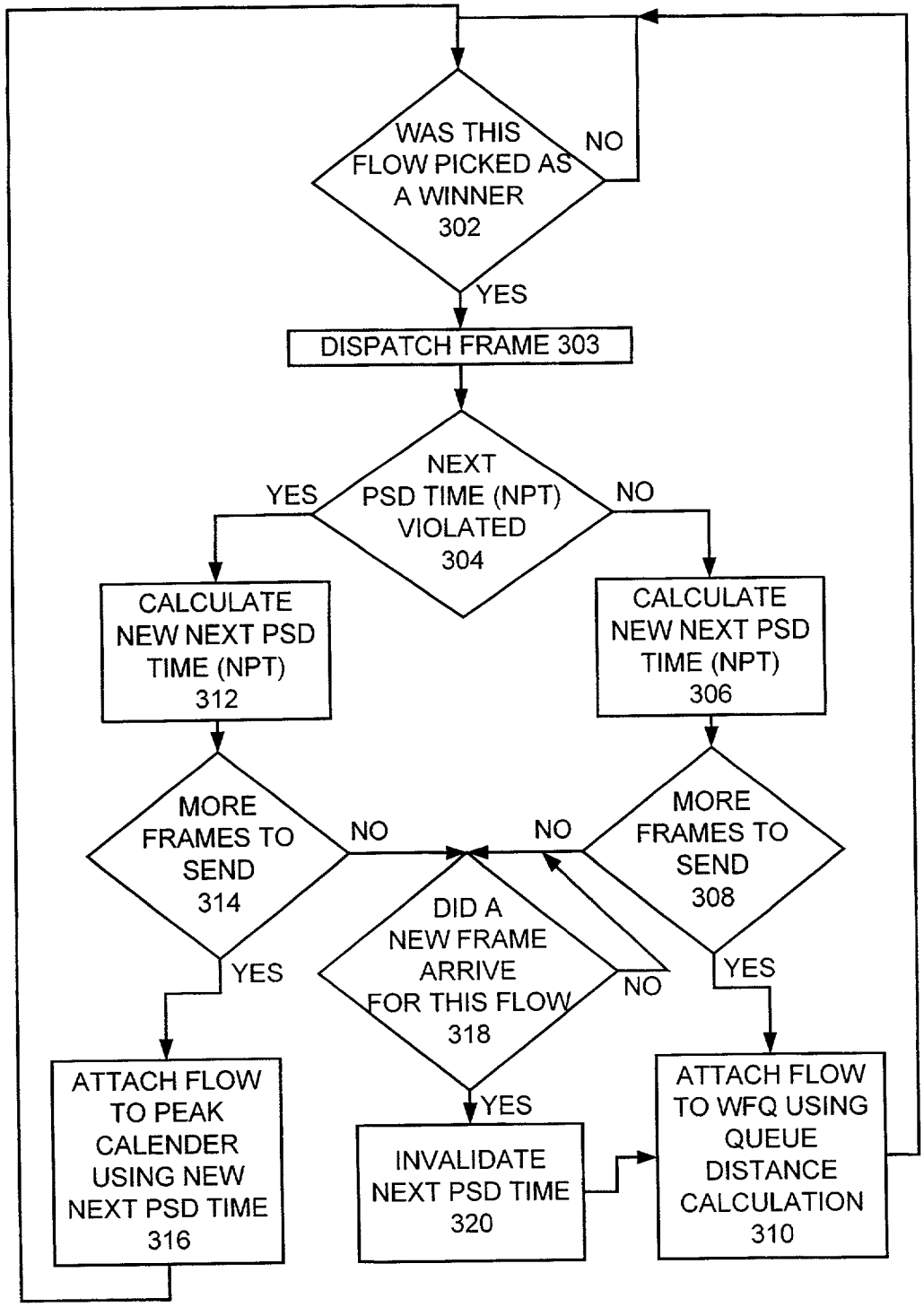
FIG. 3 is a flow chart illustrating prior art steps for attaching a flow after the flow goes empty.
Figure 4A:
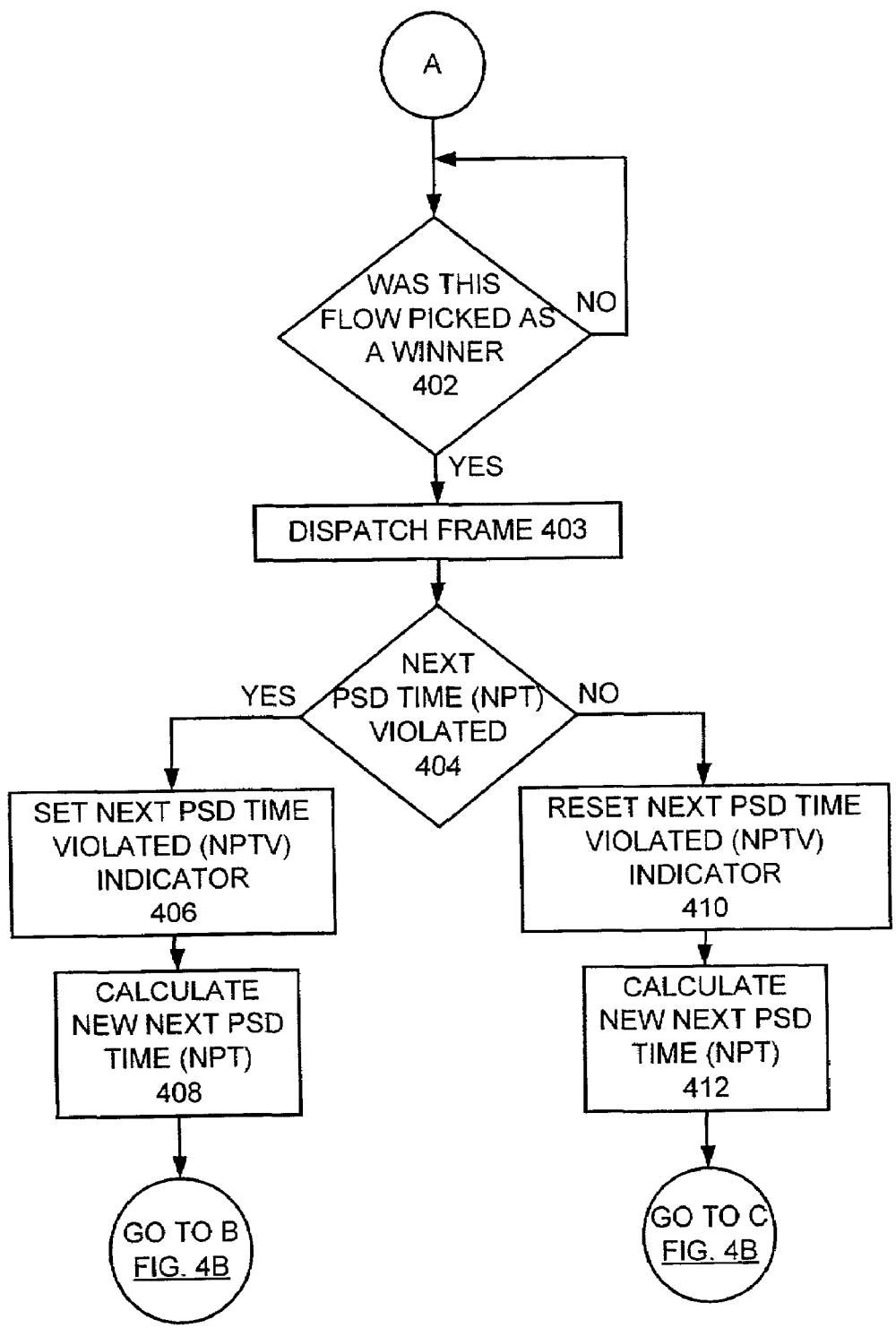
FIG. 4 is a flow chart illustrating exemplary sequential steps for carrying out scheduling methods for implementing peak service distance using next peak service time violated indication for attaching a flow after the flow goes empty of the preferred embodiment.
Figure 4B:
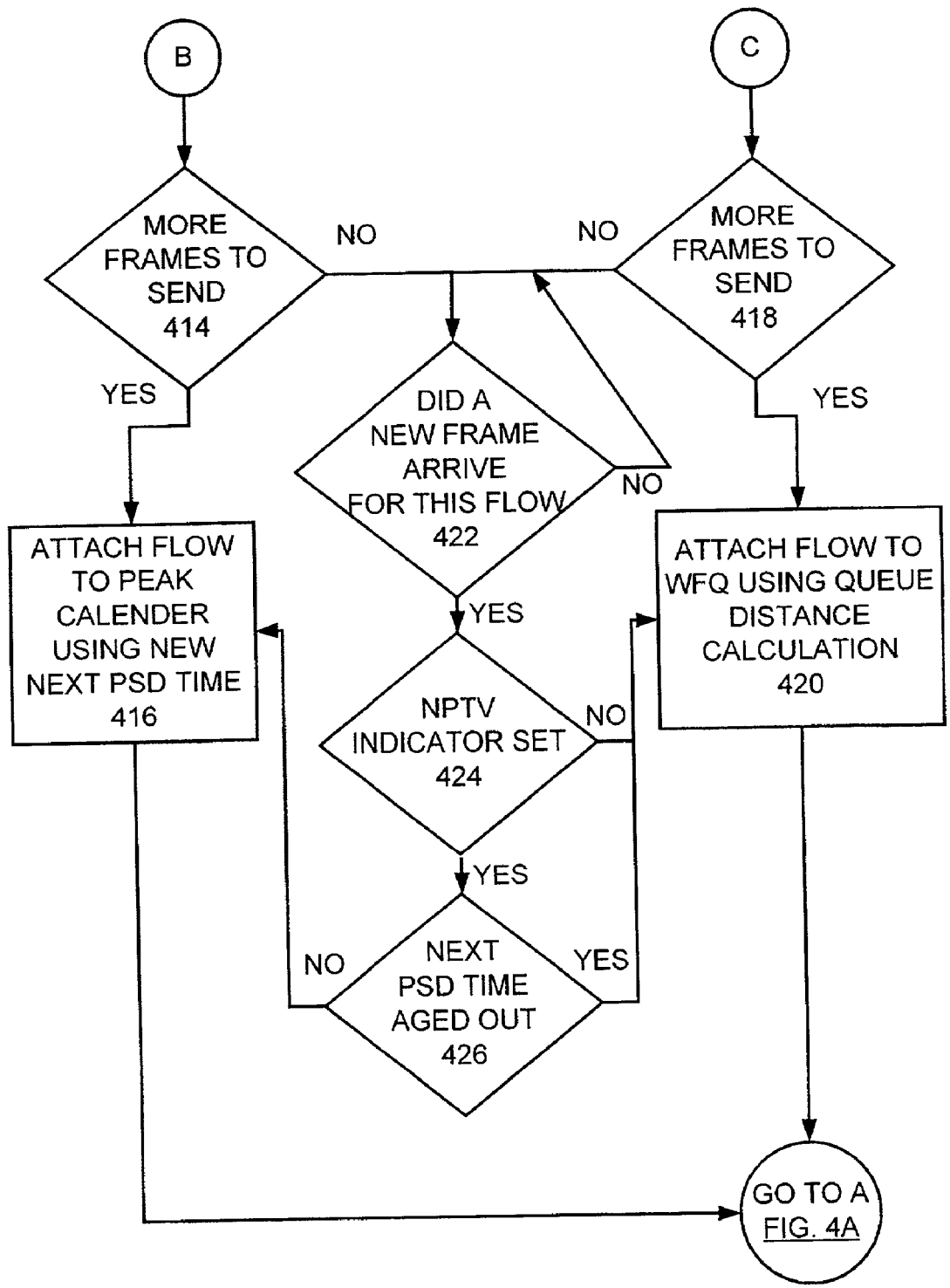

FIG. 3 illustrates a problem resulting from conventional scheduling steps for attaching a flow after the flow goes empty. FIGS. 4A and 4B illustrate scheduling steps for attaching a flow after the flow goes empty in accordance with the preferred embodiment. As shown in FIGS. 3, 4A and 4B, a flow is configured to have weighted fair queue (WFQ) component specified by queue distance (QD) and a peak service distance (PSD). The flow also may or may not have a normal latency service (NLS) component. However, it is assumed for simplicity that the flow has no NLS component because the NLS component is not required to understand the problem solved by the present invention.

When a first frame is attached to the flow, the flow is scheduled on the weighted fair queue (WFQ) ring. If more frames for this flow arrive before the flow is serviced or selected as a winner, these frames are chained onto the flow frame list. At some point the flow is chosen for servicing, that is the flow is picked as the winner. At that time a frame is dispatched from the flow. If the flow has more frames that can be dispatched, then the flow is rescheduled on the WFQ. If the flow has no more frames, that is the flow is empty; then the flow is not rescheduled on the WFQ ring. Whether or not the flow is rescheduled, a next PSD time (NPT) value for the flow is calculated, using the peak service distance (PSD) value and the size of the frame that was just dispatched. The NPT specifies the earliest time that the flow can be serviced again without violating the PSD specification.

As indicated in a decision block 302 after the flow was rescheduled on the WFQ, at some point the flow will again be a winner, and one of its frames will be dispatched. It is determined whether the next PSD time was violated as indicated in a decision block 304. If at that time the frame is dispached, the current time (CT) is greater than or equal to the NPT, then flow has not exceeded its peak bandwidth specification (PSD) and the next PSD time (NPT) was not violated at decision block 304. In this case, a new next PSD time (NPT) is calculated as indicated in a block 306 and it is determined whether the flow has more frames to send as indicated in a decision block 308. When the flow has more frames, the flow is rescheduled on the WFQ ring using a queue distance calculation as indicated in a block 310. Then the sequential steps return to block 302.

If, however, CT is less than NPT, then flow has exceeded its peak bandwidth specification and the next PSD time (NPT) was violated at decision block 304. In this case, there are two ways that the flow might be handled. A new next PSD time (NPT) is calculated as indicated in a block 312 and it is determined whether the flow has more frames to send as indicated in a decision block 314. If the flow has still more frames to be dispatched, then the flow is attached on the PSD calendar using the new next PSD time (NPT) as indicated in a block 316. The flow is scheduled at a time equal to the NPT that was calculated at block 312 for the frame that was just dispatched. This ensures that the flow will not again be serviced until it is at or below its peak bandwidth specification, to avoid violating the PSD specification for the flow. Then the sequential steps return to block 302. If the flow goes empty (there are no more frames to be dispatched), this is identified at decision block 314, and the flow is not rescheduled on either the PSD calendar or on the WFQ ring. This situation, where the flow is not rescheduled on either the PSD calendar or on the WPQ calendar, presents a problem in the prior art in that the flow that violated NPT can receive much more bandwidth than specified by its PSD.

When no more frames for the flow that did not violate NPT are identified at decision block 308, or no more frames for the flow that did violate NPT are identified at decision block 314, checking for a new frame to arrive for this flow is performed as indicated in a decision block 316. When a new frame is identified for either the flow that did not violate NPT or the flow that did violate NPT, then the next PSD time is invalidated as indicated in a block 318 and the flow is attached to WFQ ring using a queue distance (QD) calculation at block 310.

After the new frame for this flow that violated its PSD specification arrives and the flow is scheduled on the WFQ, it is possible that the flow may immediately be selected as a winner. In that case the new frame would be dispatched and the flow would again be empty. This cycle could repeat indefinitely, and the timing could be such that the flow would receive much more bandwidth than specified by its PSD specification.

Referring now to FIGS. 4A and 4B, there are shown exemplary sequential steps for carrying out scheduling methods for implementing peak service distance for attaching a flow after the flow goes empty using a next peak service time violated indication of the preferred embodiment. Scheduler 200 as shown in FIGS. 4A and 4B solves the prior art scheduling problem of FIG. 3 that is possible when a flow violates its peak service distance (PSD) specification at the same time that the flow goes empty. An indicator called next PSD time violated (NPTV) is provided by the preferred embodiment to rectify the prior art scheduling problem described above.

Referring now to FIG. 4A, a flow is picked as a winner as indicated in a decision block 402 and one of its frames is dispatched. It is determined whether the next PSD time (NPT) was violated as indicated in a decision block 404. As described above, the next PSD time (NPT) was not violated at that time the frame is dispached, if the current time (CT) is greater than or equal to the NPT, then flow has not exceeded its peak bandwidth specification (PSD). If the next PSD time (NPT) was violated at that time the frame is dispached, then the next PSD time violated (NPTV) indicator is set for the flow that has exceeded its PSD specification as indicated in a block 406. A new next PSD time (NPT) is calculated as indicated in a block 408. Then the sequential steps continue following entry point B in FIG. 4B.

When the next PSD time (NPT) was not violated at that time the frame is dispached, then the next PSD time violated (NPTV) indicator is reset for the flow that has not exceeded its PSD specification as indicated in a block 410. A new next PSD time (NPT) is calculated as indicated in a block 412. Then the sequential steps continue following entry point C in FIG. 4B.

Referring now to FIG. 4B, following entry point B checking for more frames to send for the flow that has exceeded its PSD specification is performed as indicated in a decision block 414. When the flow has more frames to be dispatched, then the flow is attached on the PSD calendar using the new next PSD time (NPT) as indicated in a block 416. This ensures that the flow will not again be serviced until it is at or below its peak bandwidth specification, to avoid violating the PSD specification for the flow. Then the sequential steps return following entry point A in FIG. 4A.

In FIG. 4B following entry point C, checking for more frames to send for the flow that has not exceeded its PSD specification is performed as indicated in a decision block 418. When the flow has more frames to be dispatched, then the flow is attached on the WFQ ring using the queue distance calculation as indicated in a block 420. Then the sequential steps return following entry point A in FIG. 4A.

In accordance with features of the preferred embodiment, when the flow goes empty, then the NPTV indicator is used to determine how a new attach should be performed when a new frame for the flow arrives. When no more frames for the flow that did violate NPT are identified at decision block 414, or no more frames for the flow that did not violate NPT are identified at decision block 418, checking for a new frame to arrive for the flow is performed as indicated in a decision block 422. When a new frame is identified for either flow, then it is determined whether the NPTV indicator is set as indicated in a decision block 424.

If the NPTV indicator is off, then the flow did not violate its PSD specification when it went empty. The flow, therefore, is scheduled on the WFQ ring using the queue distance calculation at block 420. Then the sequential steps return following entry point A in FIG. 4A.

If the NPTV indicator is set or on, checking whether NPT has aged out or is invalid is performed as indicated in a decision block 426. When the NPTV indicator is set or on, and NPT is not valid because the flow has been aged out by the FQCB aging array 230 or the current time (CT) is greater than or equal to NPT, then the flow is scheduled on the WFQ ring using the queue distance calculation at block 420. The flow that violated its PSD specification when it went empty is attached to the WFQ ring because enough time has already passed such that the bandwidth for the flow is again at or below the peak bandwidth or PSD specification. Then the sequential steps return following entry point A to block 402 in FIG. 4A.

Otherwise, if the NPTV indicator is on at block 424, and NPT is valid where the CT is less than NPT, then the flow is scheduled on the PSD calendar at NPT at block 416. This is because the flow violated its PSD specification when it went empty, and not enough time has passed to put the bandwidth for the flow at or below its peak bandwidth or PSD specification.

Figure 5:
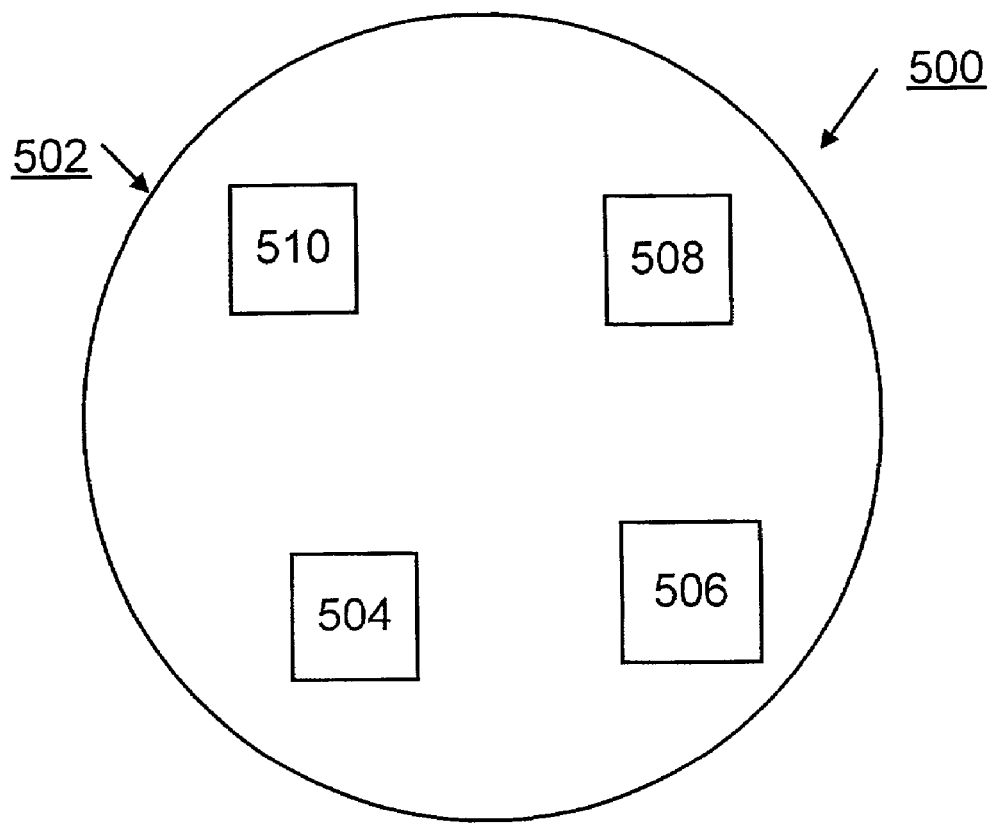
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out scheduling methods for implementing peak service distance using a next peak service time violated indication of the preferred embodiment in the system 100 of FIG. 1A.

A sequence of program instructions or a logical assembly of one or more interrelated modules defined by the recorded program means 504, 506, 508, 510, direct the scheduler 200 for implementing peak service distance using a next peak service time violated indication of the preferred embodiment.

While the present invention has been described with reference to the details of the embodiments of the invention shown in the drawing, these details are not intended to limit the scope of the invention as claimed in the appended claims.

What is claimed is:

1. A scheduling method for implementing peak service distance (PSD) using a next peak service distance time violated (NPTV) indication comprising the steps of:

identifying a flow scheduled on a best effort or weighted fair queue (WFQ) for servicing and dispatching a frame from said identified flow;

checking for a next PSD time (NPT) for said flow being violated;

responsive to identifying said next PSD time (NPT) being violated for said dispatched flow, setting a NPTV indicator;

responsive to identifying said next PSD time (NPT) not being violated for said dispatched flow, resetting said NPTV indicator;

calculating a next PSD time (NPT) value for said flow;

checking for more frames to be dispatched from said flow; and responsive to identifying no more frames to be dispatched from said flow, utilizing said NPTV indicator to identify a calendar for attaching said flow upon a new frame arrival for said flow.

2. A scheduling method for implementing peak service distance as recited in claim 1 wherein the step of checking for a next PSD time (NPT) for said flow being violated includes the steps of comparing a current time of said frame being dispatched with a current NPT value for said flow; identifying said next PSD time (NPT) not being violated for said dispatched flow responsive to said current time being greater than or equal to said current NPT value for said flow; and identifying said next PSD time (NPT) being violated for said dispatched flow responsive to said current time being less than said current NPT value for said flow.

3. A scheduling method for implementing peak service distance as recited in claim 1 includes the steps responsive to identifying said next PSD time (NPT) being violated for said dispatched flow and identifying more frames to be dispatched from said flow, attaching said flow to a peak bandwidth service (PBS) calendar.

4. A scheduling method for implementing peak service distance as recited in claim 1 includes the steps responsive to identifying said next PSD time (NPT) not being violated for said dispatched flow and identifying more frames to be dispatched from said flow, attaching said flow to a weighted fair queue (WFQ) ring.

5. A scheduling method for implementing peak service distance as recited in claim 1 wherein the step responsive to identifying no more frames to be dispatched from said flow, of utilizing said NPTV indicator to identify said calendar for attaching said flow upon said new frame arrival for said flow includes the steps of checking for said NPTV indicator being set, and responsive to said NPTV indicator not being set, attaching said flow to a weighted fair queue (WFQ) ring.

6. A scheduling method for implementing peak service distance as recited in claim 5 wherein the step of attaching said flow to said weighted fair queue (WFQ) ring includes the step of calculating a queue distance.

7. A scheduling method for implementing peak service distance as recited in claim 1 wherein the step responsive to identifying no more frames to be dispatched from said flow, of utilizing said NPTV indicator to identify said calendar for attaching said flow upon said new frame arrival for said flow includes the steps of checking for said NPTV indicator being set, and responsive to said NPTV indicator being set, of checking whether said calculated next PSD time (NPT) value for said flow has been passed.

8. A scheduling method for implementing peak service distance as recited in claim 7 include the steps responsive to said calculated next PSD time (NPT) value for said flow having been passed, of attaching said flow to a weighted fair queue (WFQ) ring utilizing a queue distance calculation.

9. A scheduling method for implementing peak service distance as recited in claim 7 include the steps responsive to said calculated next PSD time (NPT) value for said flow not having been passed, of attaching said flow to a peak bandwidth service (PBS) calendar utilizing said calculated next PSD time (NPT) value for said flow.

10. A scheduler for implementing peak service distance (PSD) using a next peak service distance time violated (NPTV) indication comprising:

a queue manager;

memory coupled to said queue manager for storing flow queue control block (FQCB) information for each of a plurality of flows to be serviced and for storing frame control block (FCB) information for said flows; said FQCB information including QoS parameters for each flow including the peak service distance (PSD) and a queue distance (QD);

a plurality of calendars coupled to said queue manager for scheduling flows;

a winner partition for arbitrating between said calendars and rings for identifying a flow for servicing and dispatching a frame from said identified flow;

said queue manager for checking for a next PSD time (NPT) for said identified flow being violated;

said queue manager being responsive to an identified said next PSD time (NPT) being violated for said identified flow, for setting a NPTV indicator;

said queue manager being responsive to an identified said next PSD time (NPT) not being violated for said identified flow, for resetting said NPTV indicator for said identified flow;

said queue manager for calculating a next PSD time (NPT) value for said identified flow;

said queue manager for checking for more frames to be dispatched from said identified flow; and said queue manager responsive to identifying no more frames to be dispatched from said flow, for utilizing said NPTV indicator to identify one of said plurality of calendars for attaching said flow upon a new frame arrival for said identified flow.

11. A scheduler for implementing peak service distance (PSD) as recited in claim 10 include a memory manager coupled to said queue manager for coordinating accesses to said memory.

12. A scheduler for implementing peak service distance (PSD) as recited in claim 10 wherein said plurality of calendars coupled to said queue manager for scheduling flows include a weighted fair queue (WFQ) ring and a peak bandwidth service (PBS) calendar.

13. A scheduler for implementing peak service distance (PSD) as recited in claim 12 wherein said queue manager responsive to identifying no more frames to be dispatched from said flow, for utilizing said NPTV indicator to identify one of said weighted fair queue (WFQ) ring and said peak bandwidth service (PBS) calendar for attaching said flow upon a new frame arrival for said identified flow.

14. A scheduler for implementing peak service distance (PSD) as recited in claim 13 wherein said queue manager for checking for said NPTV indicator being set, and responsive to said NPTV indicator not being set, attaching said flow to said weighted fair queue (WFQ) ring upon a new frame arrival for said identified flow.

15. A scheduler for implementing peak service distance (PSD) as recited in claim 13 wherein said queue manager for checking for said NPTV indicator being set, and responsive to said NPTV indicator being set, for whether said calculated next PSD time (NPT) value for said flow has been passed.

16. A scheduler for implementing peak service distance (PSD) as recited in claim 15 wherein said queue manager responsive to said calculated next PSD time (NPT) value for said flow having been passed, for attaching said flow to said weighted fair queue (WFQ) ring upon a new frame arrival for said identified flow.

17. A scheduler for implementing peak service distance (PSD) as recited in claim 15 wherein said queue manager responsive to said calculated next PSD time (NPT) value for said flow not been passed, for attaching said flow to said peak bandwidth service (PBS) calendar upon a new frame arrival for said identified flow.

18. A computer program product for implementing peak service distance (PSD) in a scheduler, said computer program product including a plurality of computer executable instructions stored on a computer readable medium, wherein said instructions, when executed by said scheduler, cause said scheduler to perform the steps of:
   identifying a flow for servicing and dispatching a frame from said identified flow;
   checking for a next PSD time (NPT) being violated for said flow;
   responsive to identifying said next PSD time (NPT) being violated for said dispatched flow, setting a next peak service distance time violated (NPTV) indicator;
   responsive to identifying said next PSD time (NPT) not being violated for said dispatched flow, resetting said NPTV indicator;
   calculating a next PSD time (NPT) value for said flow;
   checking for more frames to be dispatched from said flow; and
   responsive to identifying no more frames to be dispatched from said flow, utilizing said NPTV indicator to identify a calendar for attaching said flow upon a new frame arrival for said flow.

19. A computer program product for implementing peak service distance (PSD) in a scheduler as recited in claim 18 wherein said instructions, when executed by said scheduler, cause said scheduler to perform the steps responsive to identifying no more frames to be dispatched from said flow, of utilizing said NPTV indicator to identify said calendar for attaching said flow upon a new frame arrival for said flow cause the scheduler to perform the steps of identifying said NPTV indicator not being set and attaching said flow to a weighted fair queue (WFQ) ring utilizing a queue distance calculation.

20. A computer program product for implementing peak service distance (PSD) in a scheduler as recited in claim 18 wherein said instructions, when executed by said scheduler, cause said scheduler to perform the steps responsive to identifying no more frames to be dispatched from said flow, of utilizing said NPTV indicator to identify said calendar for attaching said flow upon a new frame arrival for said flow cause the scheduler to perform the steps of identifying said NPTV indicator being set; checking whether said calculated next PSD time (NPT) value for said flow has been passed; responsive to said calculated next PSD time (NPT) value for said flow having been passed, attaching said flow to a weighted fair queue (WFQ) ring utilizing a queue distance calculation; and responsive to said calculated next PSD time (NPT) value for said flow not having been passed, attaching said flow to a peak bandwidth service (PBS) calendar utilizing said calculated next PSD time (NPT) value for said flow.

* * * * *